United States Patent
Nalawadi et al.

(10) Patent No.: US 7,137,016 B2
(45) Date of Patent: Nov. 14, 2006

(54) DYNAMICALLY LOADING POWER MANAGEMENT CODE IN A SECURE ENVIRONMENT

(75) Inventors: Rajeev K. Nalawadi, Folsom, CA (US); Faraz A. Siddigi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 10/660,229

(22) Filed: Sep. 10, 2003

(65) Prior Publication Data

US 2005/0055588 A1    Mar. 10, 2005

(51) Int. Cl.
*G06F 1/26* (2006.01)
*G06F 1/32* (2006.01)
(52) U.S. Cl. ..................... 713/300; 713/320
(58) Field of Classification Search .................. None
See application file for complete search history.

(56) References Cited

U.S. PATENT DOCUMENTS

| | | | | |
|---|---|---|---|---|
| 6,122,745 A | * | 9/2000 | Wong-Insley | 713/300 |
| 6,957,332 B1 | * | 10/2005 | Ellison et al. | 713/164 |
| 2003/0229802 A1 | * | 12/2003 | Challener et al. | 713/200 |

* cited by examiner

*Primary Examiner*—Lynne H. Browne
*Assistant Examiner*—Stefan Stoynov
(74) *Attorney, Agent, or Firm*—Blakely, Sokoloff, Taylor & Zafman LLP

(57) ABSTRACT

Methods and apparatuses for dynamically loading and unloading power management code at runtime in a secure environment are described herein. In one embodiment, exemplary method includes loading authenticated/trusted power management code into a memory of a secure environment of an operating system (OS) and executing the power management code within the secure environment of the OS to handle power management tasks. Other methods and apparatuses are also described.

27 Claims, 7 Drawing Sheets

DYNAMICALLY LOADING POWER MANAGEMENT CODE IN A SECURE ENVIRONMENT

FIELD

Embodiments of the invention relate to power management of a data processing system, and more specifically, to dynamically loading power management code in a secure environment of a data processing system.

BACKGROUND

In many modern communication systems, including computer networks, the reliability and security of the information being exchanged is a significant concern. For example, in the Trusted Computing Platform Alliance (TCPA) model, each computer has a trusted hardware device called a Trusted Platform Module (TPM). TPM may record information about the software and hardware environment of the computer, with each TPM having a unique endorsement key (EK). A certificate, containing information about the TPM and platform, may be issued to the owner of the EK.

Accordingly, application software having a trusted EK may communicate with other applications within the system. However, power management features have not been addressed by the currently available techniques. Currently, the power management code, such as advanced configuration power interface (ACPI) code, cannot be loaded or unloaded dynamically in a secure environment as a trusted module.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
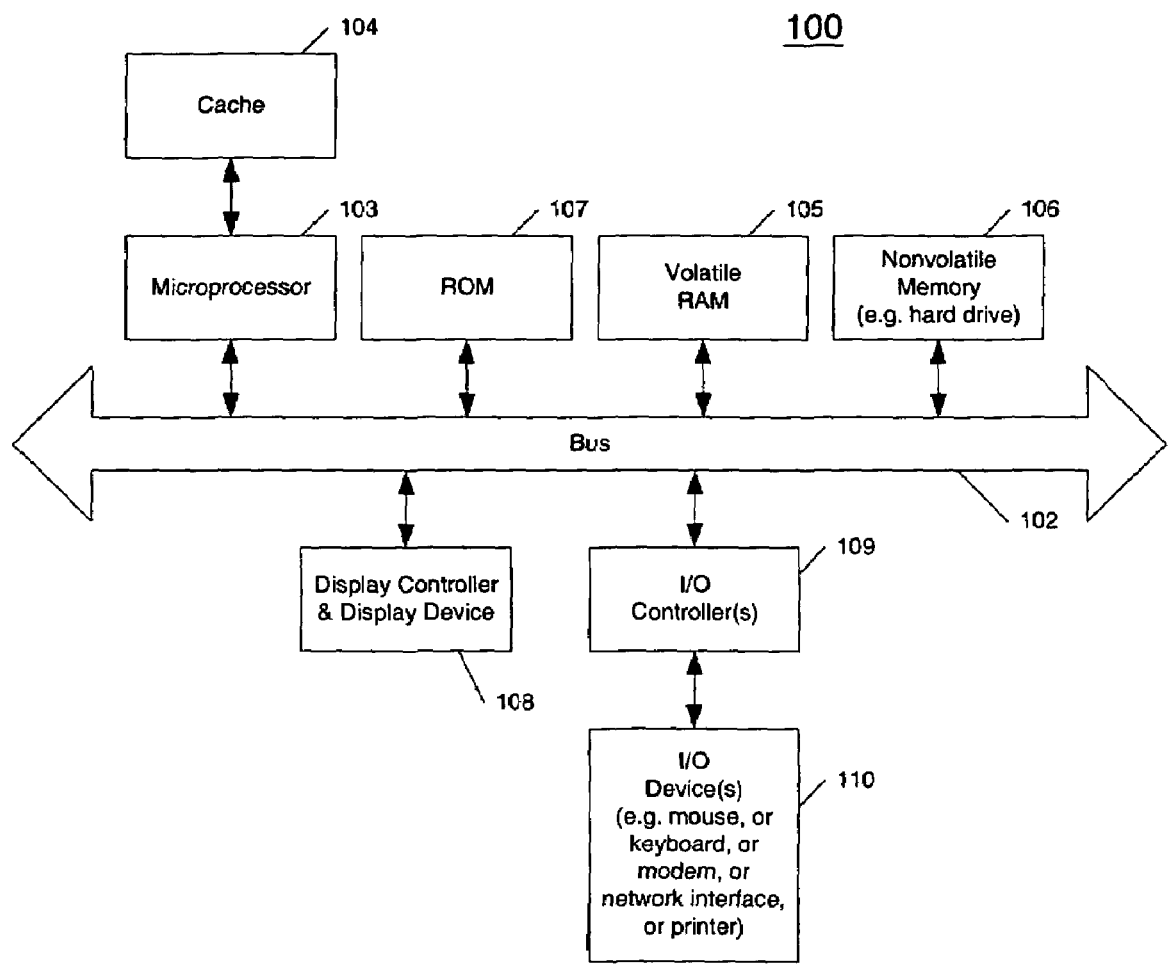
FIG. 1 is a block diagram of a data processing system which may include a dynamically loadable power management code according to one embodiment.

Methods and apparatuses for dynamically loading and unloading power management code, such as ACPI source language (ASL) code, during launch of a secure operating environment are described herein. According to one embodiment, this allows for execution of ACPI ASL control methods within the secure environment. When the secure environment is not needed, the power management code may be dynamically unloaded prior to termination of the secure environment.

According to one embodiment, prior to loading the ACPI definition block, an authentication sequence is performed by a trusted secure environment using a public-private key pair. The authentication ensures that the runtime ASL code executed is always trusted (e.g., authenticated). As a result, a critical ACPI definition block is kept secure from other untrusted entities.

In the following description, numerous specific details are set forth. However, it is understood that embodiments of the invention may be practiced without these specific details. In other instances, well-known circuits, structures and techniques have not been shown in detail in order not to obscure the understanding of this description.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

Embodiments of the present invention also relate to apparatuses for performing the operations described herein. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as Dynamic RAM (DRAM), erasable programmable ROMs (EPROMs), electrically erasable programmable ROMs (EEPROMs), magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, embodiments of the present invention are not described with reference to any particular programming language. It will be appreciated that a variety of programming languages may be used to implement the teachings of the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram of an exemplary computer which may be used with an embodiment. For example, exemplary system 100 shown in FIG. 1 may perform the processes shown in FIGS. 5–7. Exemplary system 100 may include architectures shown in FIGS. 2–4.

Note that while FIG. 1 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention.

As shown in FIG. 1, the computer system 100, which is a form of a data processing system, includes a bus 102 which is coupled to a microprocessor 103 and a ROM 107, a volatile RAM 105, and a non-volatile memory 106. The microprocessor 103, which may be one of the Pentium family of processor from Intel Corporation of Santa Clara, Calif., or a PowerPC processor from Motorola, Inc. of Schaumburg, Ill., is coupled to cache memory 104 as shown in the example of FIG. 1. The bus 102 interconnects these various components together and also interconnects these components 103, 107, 105, and 106 to a display controller and display device 108, as well as to input/output (I/O) devices 110, which may be mice, keyboards, modems, network interfaces, printers, and other devices which are well-known in the art. Typically, the input/output devices 110 are coupled to the system through input/output controllers 109. The volatile RAM 105 is typically implemented as dynamic RAM (DRAM) which requires power continuously in order to refresh or maintain the data in the memory. The non-volatile memory 106 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers, and/or adapters, as is well-known in the art. In one embodiment, the I/O controller 109 includes a USB (Universal Serial Bus) adapter for controlling USB peripherals.

According to one embodiment, an operating system (OS) may be launched and executed by processor 103 in a memory, such as volatile RAM 105. The exemplary operating system may be a Windows OS from Microsoft of Redmond, Wash. Alternatively, the operating system may be a Mac OS from Apple Computer of Cupertino, Calif. Other operating systems, such as UNIX, LINUX, or other real time embedded OSs may be utilized. The operating system may include one or more virtual machines (VMs) similar to those shown in FIGS. 2 and 3, which will be described in details further below.

In a particular embodiment, the OS may detect a secure transaction initiated by a user, such as an application handling online secure transaction with a third party over a network and launches a secure environment, such as, for example, a specific VM (also referred to as a secure or protected VM), to handle the related applications used to complete the transaction. The OS may further include a power management loader during the launching of the secure environment (e.g., the specific VM), such as an ACPI loader, to dynamically load the power management code, such as ACPI code, into a dedicated memory, which may be dedicated or reserved by the OS or hardware, such as chip set 103 of system 100. Prior to loading the power management code, according to one embodiment, the loader performs one or more authentication processes to prove that the power management code is trusted. The authentication processes may be similar to those shown in FIGS. 6 and 7. Once the power management code (e.g., ACPI code) is proved to be trusted, the power management code is loaded into the memory, which may be part of volatile memory 105. Thereafter, the user may conduct any secure transactions within the secure environment.

After the user completes the related secure transactions, the secure environment, such as corresponding secure VM may be terminated. Prior to the termination of the VM, according to one embodiment, the respective loaded power management code may be dynamically unloaded. As a result, the power management code is only loaded and executed within a secure environment having trusted parties, without unnecessarily exposing itself to an untrusted party, contrary to a conventional approach.

Figure 2:
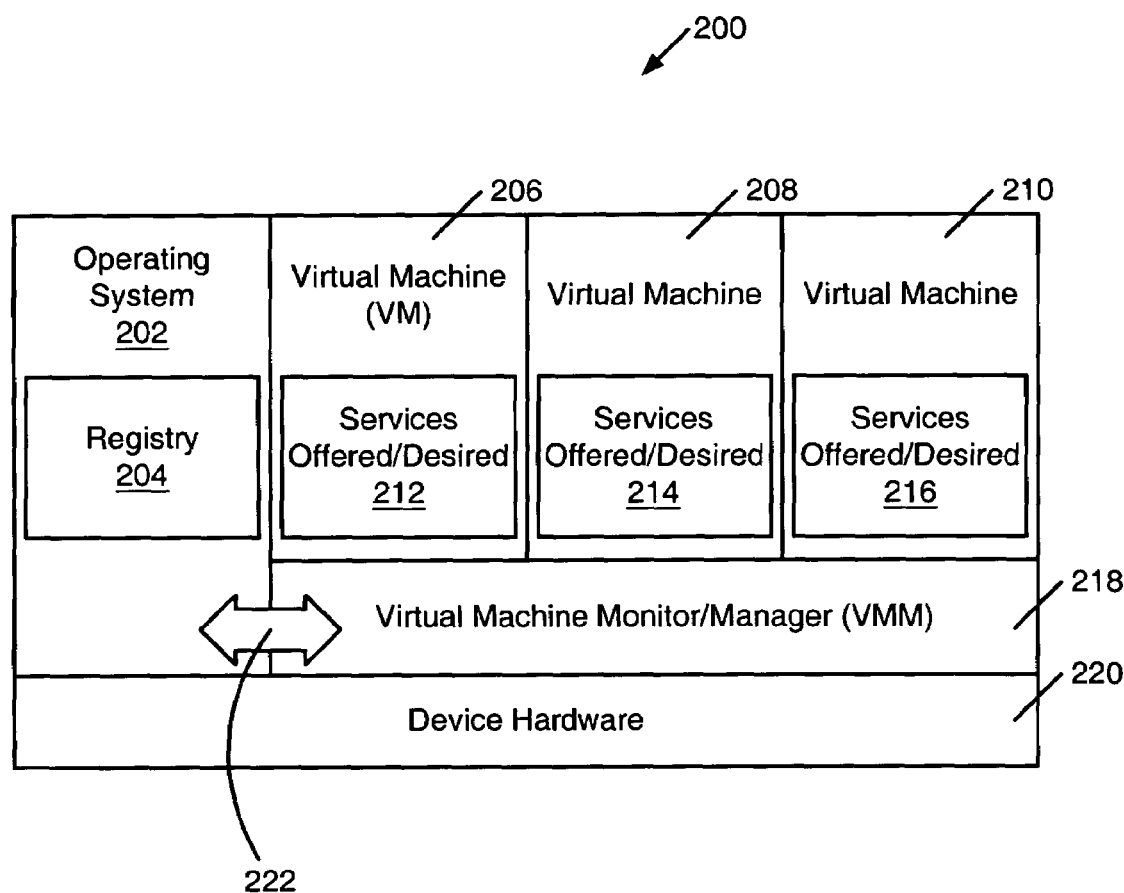
FIG. 2 is a block diagram illustrating an exemplary embodiment of an architecture according to one embodiment.

FIG. 2 is a block diagram illustrating an exemplary embodiment of system 100 of FIG. 1. As illustrated, the system has an operating system 202, and the system may include a dynamically updatable registry 204 for storing registrations of offered and/or desired services (e.g., applications) of virtual machines (VMs) 206–210 of the device. A VM may be an emulated machine or emulated platform in hardware, e.g., as a mode of operation of a processor, or in software, such as in a runtime environment. The VM may include the instruction set and other platform resources and/or devices. VM's may be serialized (e.g. state checkpoint) to a shared file system or shipped over the network to be migrated to, de-serialized (e.g. state restore from checkpoint) on and hosted by a different machine.

A single physical device (e.g., exemplary system 100 of FIG. 1) may have multiple VMs. VMs may also utilize a virtual network in addition to, or in lieu of, a physical network connection. A VM may appear or reappear on the network because its VMM (Virtual Machine Monitor or Virtual Machine Manager) has instantiated or resumed the VM. The VM may disappear from the network if the VMM shuts it down, de-instantiates (suspends) it, or otherwise makes it unavailable. Suspending, destroying or otherwise making a VM unavailable is common to allow other VMs to execute, e.g., to access a host's processor, memory, storage, etc., or when the VM no longer has utility (e.g. it has finished processing, or the service it provides is no longer needed.).

It will be appreciated that VMs may communicate with other VMs within the same physical device, with VMs on other physical devices, or simply with other physical devices. In one embodiment, multiple VMs hosted on a particular physical device may communicate among themselves on a private, virtual (optimized) network. In this latter case, the virtualization software (often the VMM or the host operating system, depending on implementation) may operate in a different manner, e.g. allowing inter-VM communication more efficiently through a virtual local network not externally visible outside of the hosting device.

Referring to FIG. 2, VMs 206–210 may be implemented in hardware, software, or some combination of the two. The VMs may appear to other network devices to be a physical device on the network. As with conventional VM environments, the VMs operate in conjunction with a VMM 218 (Virtual Machine Manager or Monitor) having hooks 222 into the host device hardware and operating system 202. For example, the VMM may make use of some host operating system services. Each VM may also have an operating system (not shown).

The term "hook" or "hooks" refers to mechanisms such as passive or active interfaces (e.g. polled API's, memory locations, or subroutine call-backs), notifications, messages, interrupts, and their associated handlers etc. Each of these provides different tradeoffs, which are important to overall system design, but may be incorporated by one skilled in the art. For example, when a VMM terminates a VM, it may notify the registry agent to remove or mark as unavailable all service entries associated with that VM. Often this might be the IP address or hostname of the VM.

According to one embodiment, VMs 206–210 operate in conjunction with a VMM 218. The VMM operates above device hardware 220 and regulates/arbitrates access by the VMs to the physical device hardware. In one embodiment, the VMM also regulates VM access to host operating system 202 resources. The VMM may be configured to allow complete isolation of VMs 206–210 (e.g., secure vs. unsecure VMs), or to allow data sharing between some or all of the VMs according to desired security policies. It will be appreciated that the VMM may be implemented in various ways, including in software, hardware, or a combination thereof on a host. For example, the VMM may be implemented as an application and device drivers (including power management functionality), etc. (e.g. VMWare by VMware, Inc. of California), as part of the operating system 202, or as part of a chipset or a microprocessor, such as processor 103 of the exemplary system 100 shown in FIG. 1.

According to one embodiment, VMM 218 is configured to monitor the state of VMs and to automatically issue notifications to a registry to cause the registration and de-registration of VM services 212–216 based on monitored state. In one embodiment, the VMM 218 monitors at least VM creation, destruction, suspension requests, as well as registry advertising/de-registration requests to identify VMs having registry registrations affected by a change in VM status. In one embodiment, operating system hooks 222 are used to monitor operating system calls relating to advertising/de-registration requests and to implement registry registration changes. The operating system 202 and registry 204 are presumed responsive to notification by the VMM to register or de-register services.

According to one embodiment, one of the VMs 206–210 may be implemented or launched as a secure VM (e.g., secure environment) in response to a secure transaction initiated by a user. For example, certain services or applications, such as services 212–216, have been certified as trusted services or applications prior to being released to a customer or distributor. When such services or applications are launched, certain communications with the system (e.g., OS 202) happen indicating that a secure operating environment is needed. As a result, prior to launching the respective application or service, a secure VM will be launched, within which the desired service or application may be launched thereafter. Other mechanisms, such as application employing strong encryption algorithms may be used to determine whether a secure environment is needed. Accordingly, the respective VM may be launched or loaded in into a dedicated memory and its services offered are launched if they are determined as trusted parties (e.g., successfully authenticated). During the launching of the secure VM, a trusted version of power management code, such as ACPI code is authenticated and loaded within the VM to handle any power management issues within the secure environment. Once the user completes the transaction, the ACPI code may be dynamically unloaded and the respective VM may be terminated thereafter.

Figure 3:
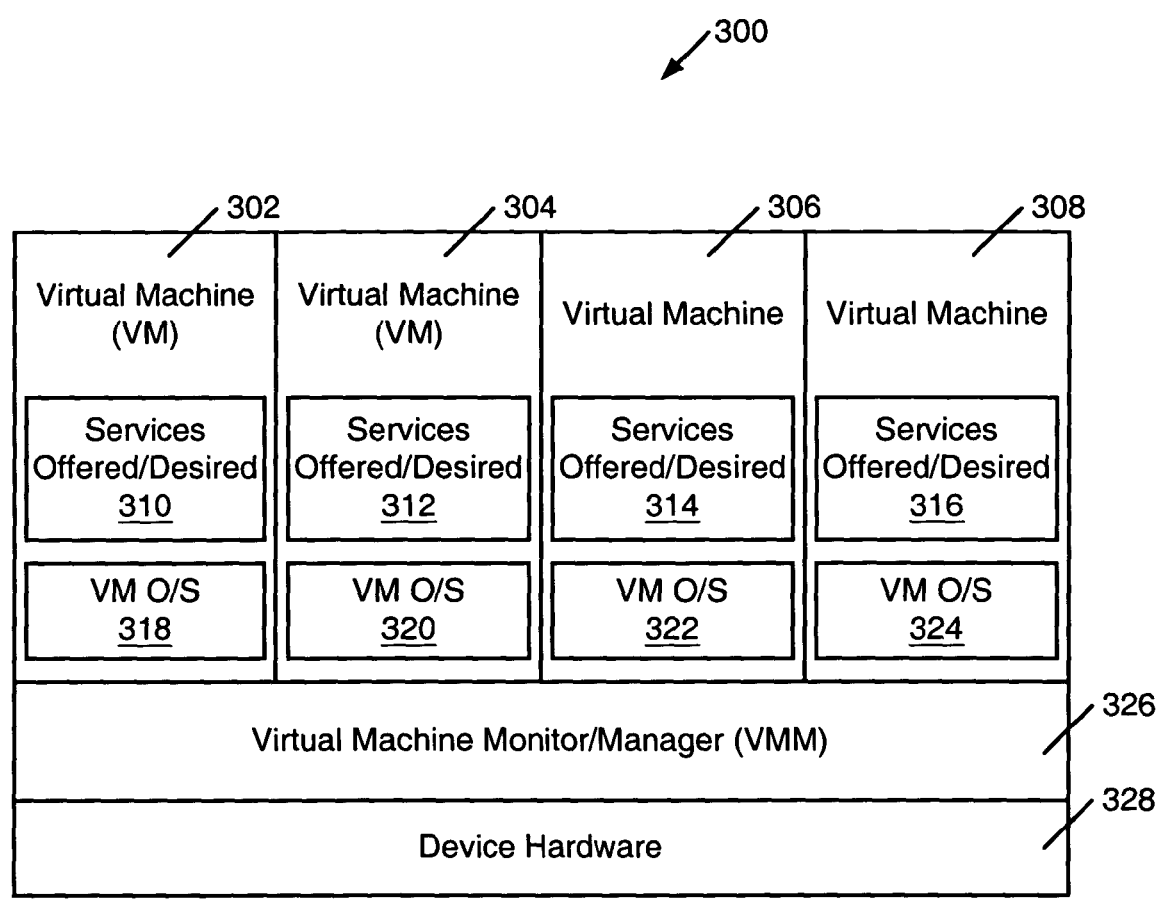
FIG. 3 is a block diagram illustrating an exemplary embodiment of an architecture according to an alternative embodiment.

FIG. 3 is a block diagram illustrating an exemplary VM/VMM system according to another embodiment, where the host does not have a particular operating system, but instead each VM 302–308 has services 310–316 desired or offered by the VM and their own operating system 318–324. The operating systems may each be the same, similar to, or different from each other. In this embodiment, the VMM operates on top of a host device's hardware 328, and the VMM manages each VM and its operating system's access to the host device's hardware.

In this embodiment, hooks between the VMM 326 and various VM operating systems 318–324 (or service modules 310–316) allow the VMM to monitor registrations of the VMs 302–308 offered and/or desired services 310–316. Some of the VMs 304–308 may be launched as a secure VM including a trusted power management code, such as trusted ACPI code.

Figure 4:
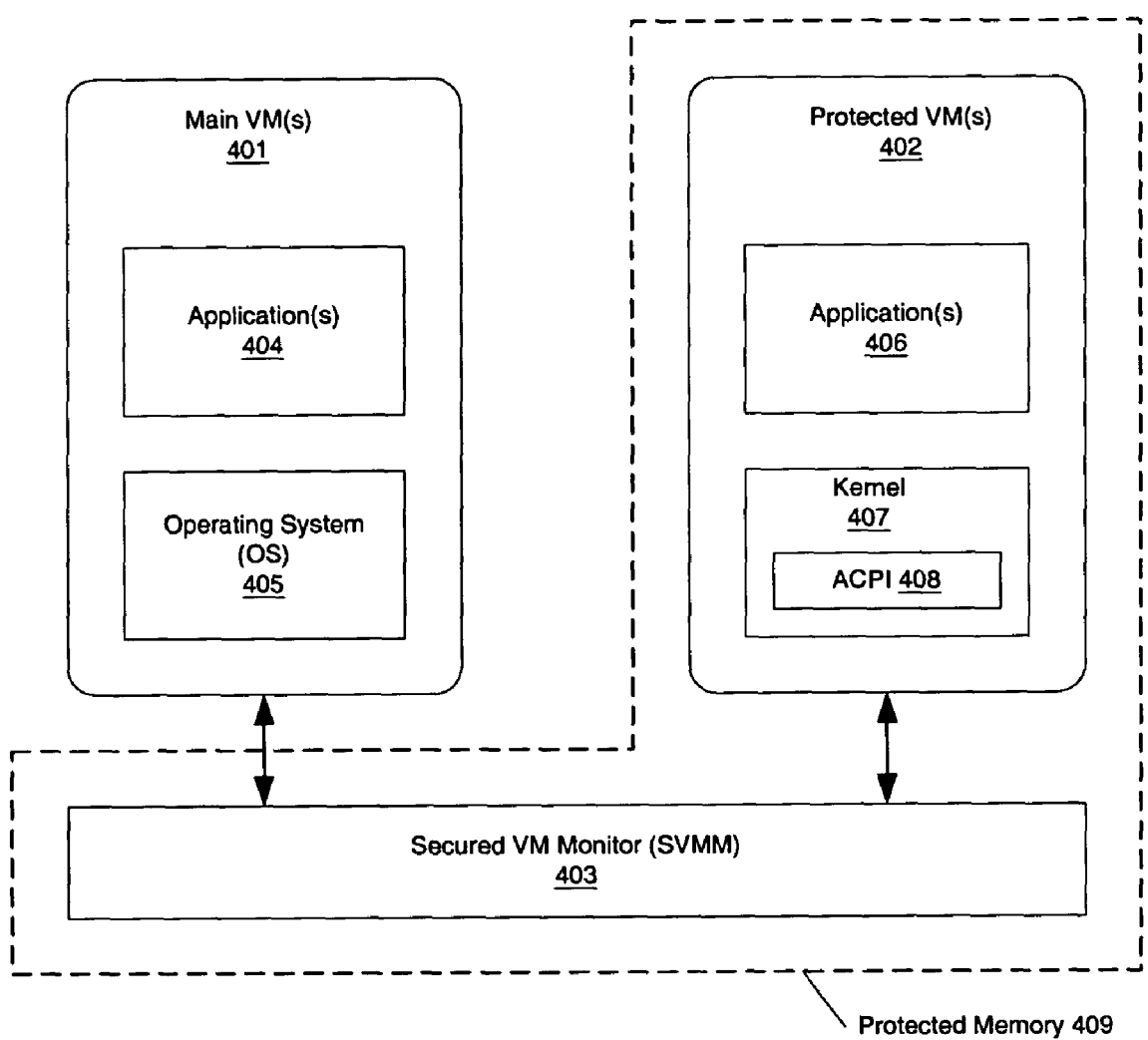
FIG. 4 is a block diagram illustrating an exemplary embodiment of an architecture according to another embodiment.

FIG. 4 is a block diagram illustrating an exemplary architecture according to one embodiment. In one embodiment, exemplary system 400 includes a secure or protected VM 402 (also referred to as an secure environment) created in response to a secure transaction initiated by a user. The secure transaction may be provided via applications 406, which may be certified as a trusted service within a community, such as, for example, the Trusted Computing Platform Alliance (TCPA). In addition, VM 402 includes a kernel portion 407 which may include a portion of the operating system, such as Windows operating system from Microsoft corporation or a Mac OS from Apple Computer, or a Linux or Unix OS etc. The respective portion of the OS interacts with the trusted platform module (TPM) hardware on the platform. TPM acts as a hardware vault where the platform credentials are stored.

According to one embodiment, while launching the secure environment associated with VM 402, power management code, such as ACPI code 408, is authenticated and loaded within VM 402. ACPI code 408 may be provided by a trusted vendor, which may be certified by a trusted community, such as TCPA alliance. Once the user has completed the transaction via applications 406, ACPI code 408 may be unloaded dynamically and the secure environment (e.g., VM 402) may be terminated thereafter. VM 402 may be managed by secured VM monitor (SVMM) 403. According to one embodiment, SVMM 403 provides domain separation, VM entry/exit policy enforcement, and inter-VM communications channels, such as communications between secure VM 402 and other VMs 401 having respective untrusted applications 404 and corresponding OS portion 405. According to one embodiment, the trusted kernel 407 provides intra-VM services and it may be designed to interact with a specific main OS, such as OS 405. Note that in one embodiment, protected VM 402 and SVMM 403 are loaded in a dedicated memory 409, which is reserved, by hardware or software, or the both for secure environments.

Both secure VM 402 and VM 401 may exist within a single host, such as system 300 of FIG. 3. For example, VM 402 may be one of the VMs shown in FIG. 3, such as VM 308, while VMs 401 may represent the rest of the VMs in FIG. 3, such as VMs 302–306. SVMM 403 may be implemented within the main VMM 326 of FIG. 3. Alternatively, SVMM 403 may be implemented independently separated from VMM 326. Other configurations may exist.

Figure 5:
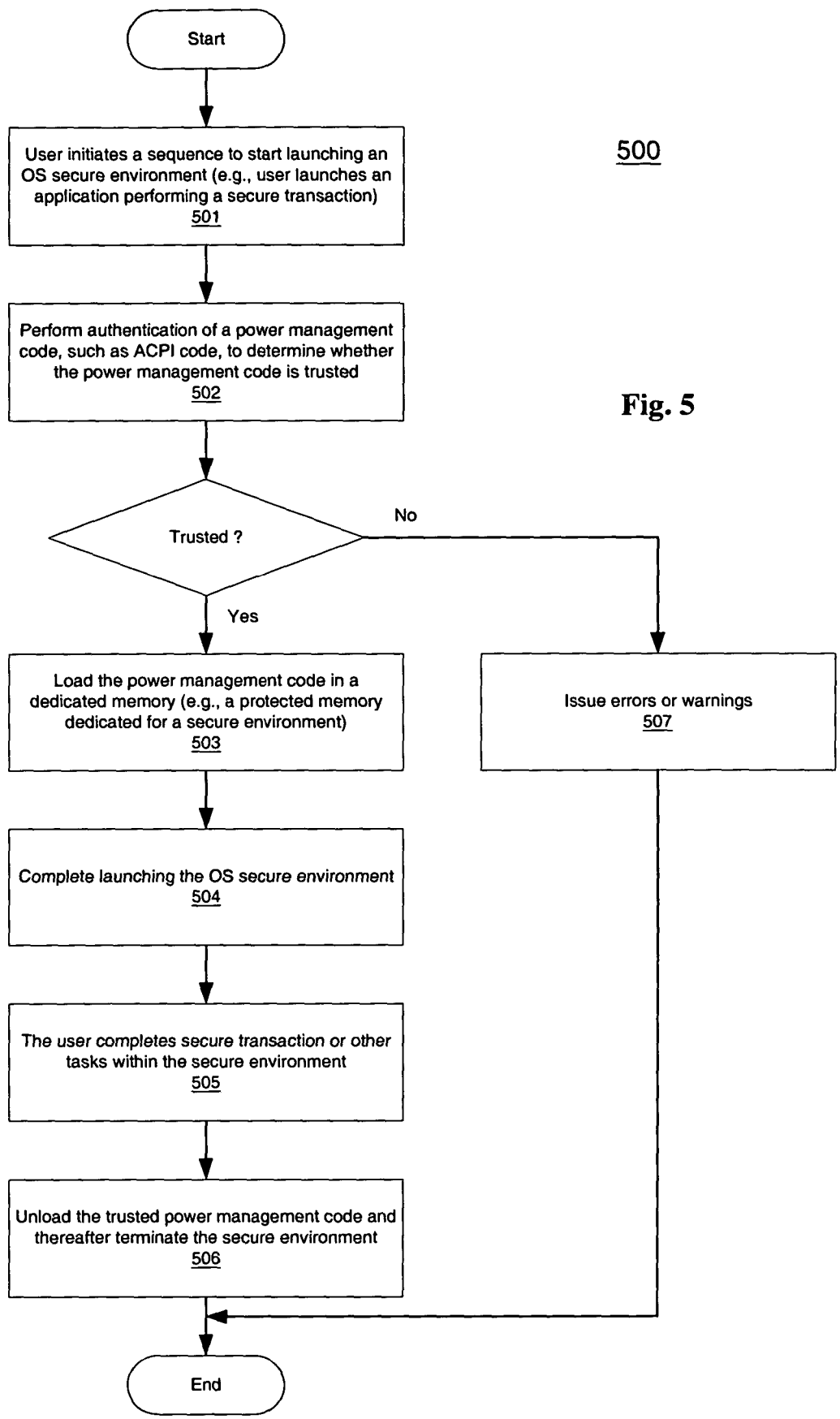
FIG. 5 is a flow diagram illustrating an exemplary process for handling power management code in a secure computing environment according to one embodiment.

FIG. 5 is a flow diagram illustrating an exemplary process for handling power management code in a secure environment according to one embodiment. Exemplary process 500 may be performed by a processing logic that may comprise hardware (circuitry, dedicated logic, etc.), software (such as is run on a general purpose computer system or a dedicated machine), or a combination of both. In one embodiment, exemplary process 500 includes authenticating power management code to determine whether the power management code is trusted, loading the power management code into a memory of a secure environment of an operating system (OS) if it is determined that the power management code is trusted, and executing the power management code within the secure environment of the OS to handle power management tasks.

Referring to FIG. 5, at block 501, a user initiates a sequence or process, such as launching a trusted application to conduct a secure transaction, in response to which the OS starts to launch a secure environment, such as VM 402, for such purposes. While launching the secure environment, processing logic may determine that the power management code, such as ACPI code, is needed for the secure environment. If it is determined that the power management code is needed, at block 502, processing logic performs an authentication on the power management code to determine whether the power management code is trusted. According to one embodiment, the power management code is needed when the corresponding application or driver is capable of handling the power management events, such as, for example, the suspend/resume or wake-on-ring events. In one embodiment, processing logic authenticates the power management code using a pair of private and public keys, similar to the private and public PGP (Pretty Good Privacy) key pair via a variety of encryption techniques, including the hash operations, such as SHA-1 (RFC 3174) or MD-5 (e.g., RFC 1321) hash function, or other encryption algorithms, such as, for example, the RSA encryption mechanisms available from RSA Security, Inc. Other processes, such as a checksum process of the code image, may be performed as a part of the authentication.

If the power management code is determined to be trusted (e.g., it has been successfully authenticated), at block 503, processing logic loads the power management code dynamically into a dedicated memory, which may be protected by the software or hardware, or the both for the purposes of the secure environments. Once the power management code is successfully loaded, at block 504, processing logic continues to complete launching the secure environment. Once the secure environment has been launched, at block 505, the user may perform a secure transaction via one or more trusted applications (e.g., applications 406 of FIG. 4) and optionally including power management operations from the loaded trusted power management code (e.g., ACPI code 408 of FIG. 4). When the user finishes the secure transaction and terminates the corresponding applications, at block 506, processing logic may determine that the power management code is no longer needed and may dynamically unload the power management code from the memory. Thereafter, the secure environment (e.g., VM 402 of FIG. 4) may be terminated.

However, if it is determined that the power management code is not trusted (e.g., it has not been successfully authenticated), at block 507, processing logic may issue one or more errors. Alternatively, processing logic may issue one or more warnings and continue to load the power management code as untrusted version and the warning message may be issued to the user to indicate that one or more components of the secure environment is not trusted. Other operations may be included.

Figure 6:
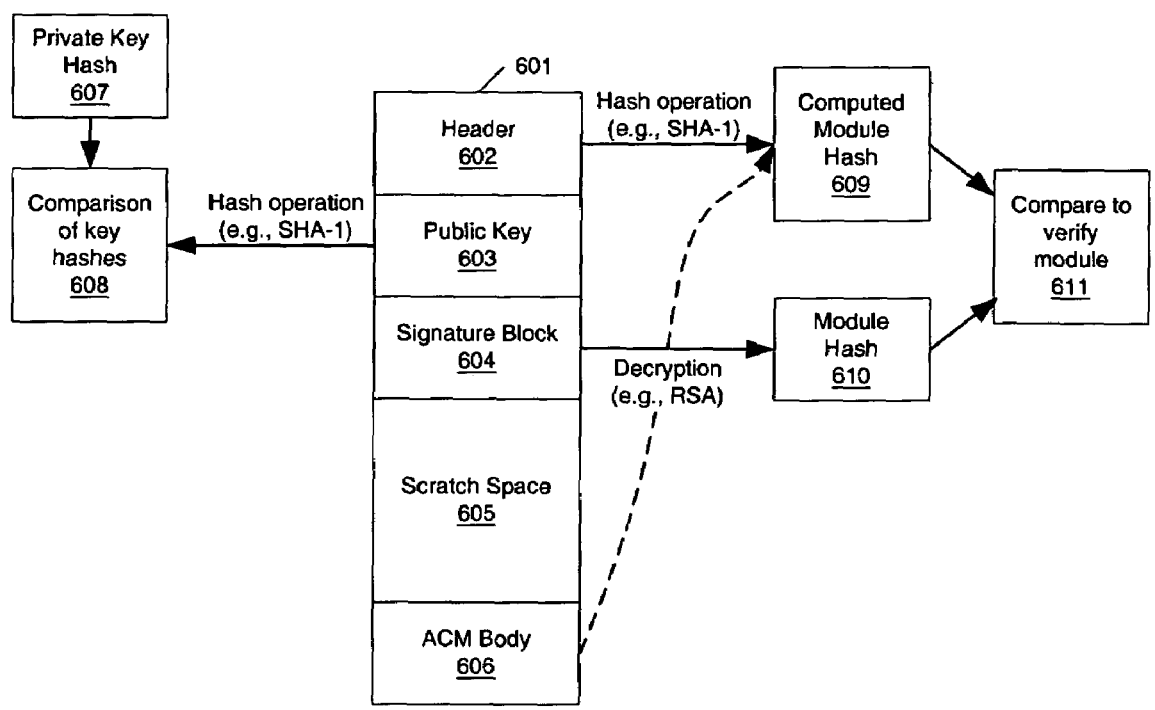
FIG. 6 is a block diagram illustrating an exemplary authentication process of power management code according to one embodiment.

FIG. 6 is a block diagram illustrating an exemplary process for authenticating power code according to one embodiment. Exemplary process 600 may be performed by a processing logic that may comprise hardware (circuitry, dedicated logic, etc.), software (such as is run on a general purpose computer system or a dedicated machine), or a combination of both. Processing logic may be located with a driver or kernel module of an operating system. Alternatively, processing logic may be embedded with a chip set of a data processing system, such as system 100 of FIG. 1.

In one embodiment, exemplary power management code 601 is an ACPI compatible code, which may include, among others, a header 602, a public key 603, a signature block 604, a ACM (ACPI code module) body 606, and some other scratch spaces 605. ACPI code 601 may be stored in a ROM, such as ROM 107 of data processing system 100 shown in FIG. 1. Alternatively, ACPI code 601 may be stored in a nonvolatile RAM, such as nonvolatile RAM 106. ACPI code 601 may be provided by a vendor, which qualifies as a trusted member of a community, such as TCPA (Trusted Computing Platform Alliance) community member. In one embodiment, public key 603 is embedded within the ACPI code 601 by the vendor or manufacturer. Public key 603 is one of the private and public key pair previously agreed upon between the vendor of the system, such as the operating system or the chip set, and the vendor of the power management code. The public key hash 607 corresponding to public key 603 may be stored within the data processing system, such as ROM 107 of system 100. Alternatively, the public key hash may be stored within the chip set of the system. The public key hash can be compared with the public key embedded in the ACM (ACPI code module). The private key may be stored in a protected place at the signing facility in a secure environment. The developer/owner of the ACM will get the module signed using private key. Private key is not needed at the time of runtime authentication, only public key is needed for authentication. In one embodiment, ACM body 606 includes ACPI code module which is a machine dependent language compiled from source code written in a variety of programming languages, such as C/C++ or Assembly languages.

Referring to FIG. 6, processing logic reads public key 603 from ACPI code 601 and performs a hash operation on the public key 603. In one embodiment, the hash operation may be performed using a hash function, such as SHA-1 or MD-5 hash function. The hashed public key may then be compared with the computed hash of public key 607 to determine whether they are matched (operation 608).

If the public key hash in the hardware matches the computed hash of the public key in the module, according to one embodiment, processing logic reads the header 602 and the ACM body 606 from the ACPI code 601 to generate a first computed module hash result 609, via a hash operation, such as SHA-1 or MD-5 hash function. Thereafter, processing logic reads the signature block 604 from ACPI code 601 and performs a decryption on signature block 604. In one embodiment, signature block 604 may be decrypted using a public key via a variety of decryption algorithms, such as an RSA decryption algorithm from RSA Security, Inc., to generate a second module hash result 610. The first and second module hash results 609 and 610 are compared, via operation 611, to determine whether they are matched. If they are matched, the ACPI code 601 has been successfully authenticated.

Figure 7:
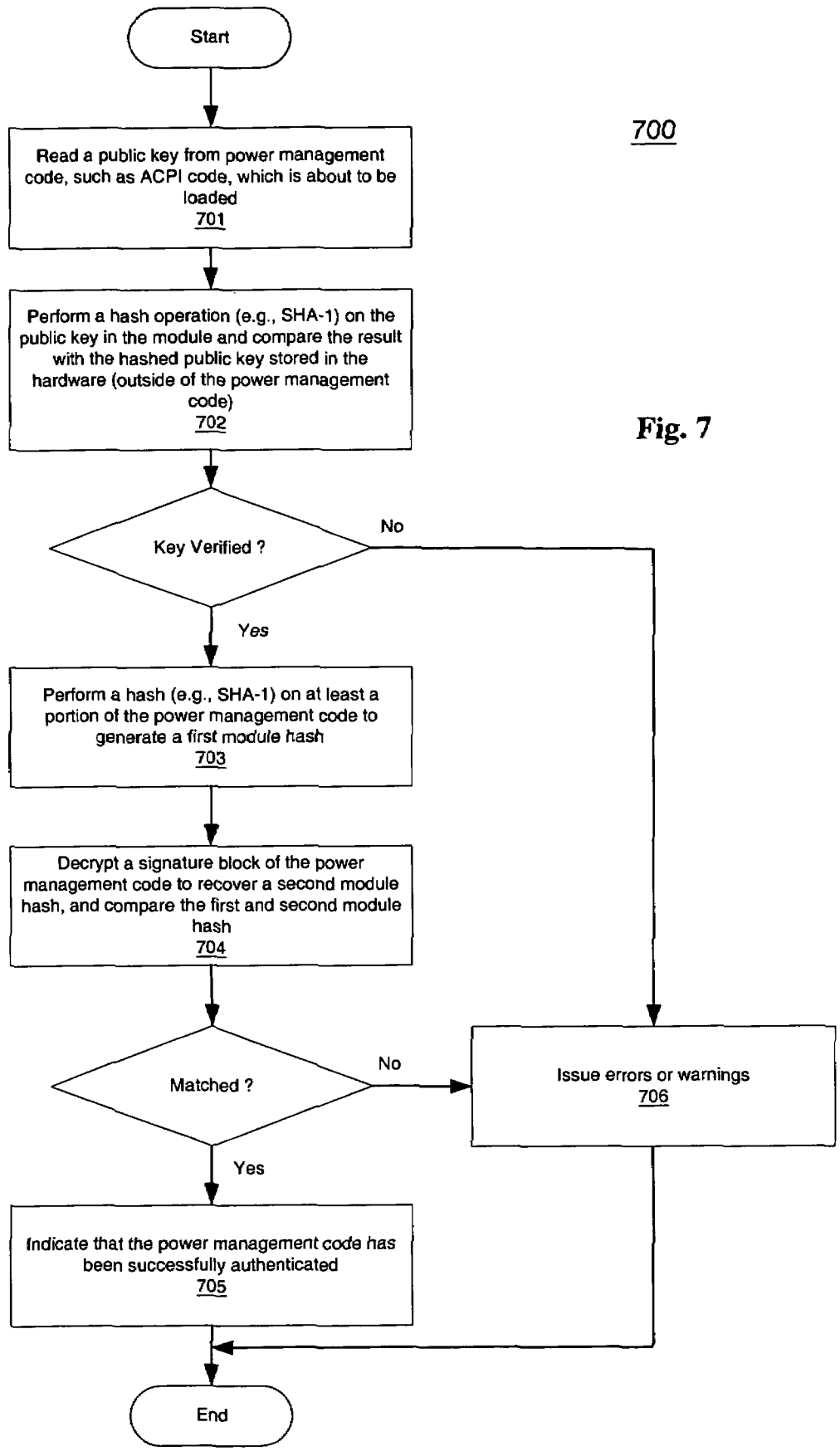
FIG. 7 is a flow diagram illustrating an exemplary authentication process of power management code according to one embodiment.

FIG. 7 is a flow diagram illustrating an exemplary process for authenticating power management code in accordance with one embodiment. Exemplary process 700 may be performed by a processing logic that may comprise hardware (circuitry, dedicated logic, etc.), software (such as is run on a general purpose computer system or a dedicated machine), or a combination of both.

Referring to FIG. 7, during the launching of a secure environment, at block 701, processing logic reads a public key (e.g., public key 603), which may be agreed upon and stored in a power management code (e.g., ACPI code) during a manufacturing process of the power management code. At block 702, processing logic performs a hash operation on the public key using, for example, SHA-1 or MD-5 hash function and compare the hash result with a hashed public key previous stored in hardware, such as I/O Controllers 109 of FIG. 1, to determine whether the modules are signed using the correct keys.

If the public key hash stored in the hardware matches the computed hash of the public key in the module, at block 703, processing logic performs another hash operation via a hash function (e.g., SHA-1 or MD-5 hash function) on at least a portion of the power management code, such as header 602 of ACPI code 601 shown in FIG. 6, to generate a first module hash result (e.g., hash result 609). At block 704, processing logic decrypts a second portion of the power management code (e.g., signature block 604 of ACPI code 601 shown in FIG. 6) to recover a second module hash result. Processing logic then compares the first and second module hash results to determine whether they are matched. If the first and second module hash results are matched, at block 705, processing logic indicates that the respective power management code has been successfully authenticated. Otherwise, if the hardware obtained public key hash and computed hash of the public key in the module are not matched or the first and second module hash results are not matched, at block 706, processing logic may issue an error message or a warning message. Other operations apparent to those with ordinary skill in the art may be performed.

Thus, methods and apparatuses for dynamically loading and unloading power management code in a secure environment have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
   determining whether a secure environment of the OS has been activated;
   loading authenticated/trusted power management code into a memory of a secure environment of an operating system (OS); and
   executing the power management code within the secure environment of the OS to handle power management tasks, wherein loading and executing the power management code are performed if the secure environment is activated.

2. The method of claim 1, wherein the secure environment of the OS is launched and executed within a virtual machine (VM) within the OS, and wherein the OS includes a plurality of VMs having a task carried out by the respective VM.

3. The method of claim 2, further comprising monitoring activities of the respective VM including whether the secure environment is about to terminate.

4. The method of claim 1, further comprising:
   determining whether the secure environment of the OS is about to terminate; and
   terminating and unloading the power management code from the memory prior to terminating the secure environment of the OS.

5. The method of claim 1, wherein the secure environment is launched in response to an initiation of a secure transaction by a user.

6. The method of claim 1, further comprising authenticating the power management code to determine whether the power management code is trusted.

7. A method, comprising:
   authenticating a power management code to determine whether the power management code is trusted, including
      retrieving a public key from the power management code,
      computing, via one or more hash operations, a hash of the public key, and
      comparing, the computed hash of the public key with a public key hash stored outside of the power management code to authenticate the power management code,
   loading authenticated/trusted power management code into a memory of a secure environment of an operating system (OS); and
   executing the power management code within the secure environment of the OS to handle power management tasks.

8. The method of claim 7, further comprising verifying images of one or more modules within the power management code.

9. The method of claim 8, wherein verifying the images comprises:
   decrypting a signature block of the power management code to form a first module hash block;
   performing one or more hash operations on at least one portions of the power management code to generate a second module hash block; and
   comparing the first and second module hash blocks to verify the one or more modules.

10. A machine-readable storage medium having executable code to cause a machine to perform a method for power management, the method comprising:

determining whether a secure environment of the OS has been activated;
loading authenticated/trusted power management code into a memory of a secure environment of an operating system (OS); and
executing the power management code within the secure environment of the OS to handle power management tasks, wherein loading and executing the power management code are performed if the secure environment is activated.

11. The machine-readable storage medium of claim 10, wherein the secure environment of the OS is launched and executed within a virtual machine (VM) within the OS, and wherein the OS includes a plurality of VMs having a task carried out by the respective VM.

12. The machine-readable storage medium of claim 11, wherein the method further comprises monitoring activities of the respective VM including whether the secure environment is about to terminate.

13. The machine-readable storage medium of claim 10, wherein the method further comprises:
determining whether the secure environment of the OS is about to terminate; and
terminating and unloading the power management code from the memory prior to terminating the secure environment of the OS.

14. The machine-readable storage medium of claim 10, wherein the secure environment is launched in response to an initiation of a secure transaction by a user.

15. The machine-readable storage medium of claim 10, further comprising authenticating the power management code to determine whether the power management code is trusted.

16. A machine-readable storage medium having executable code to cause a machine to perform a method for power management, the method comprising:
authenticating a power management code to determine whether the power management code is trusted, including
retrieving a public key from the power management code;
computing, via one or more hash operations, a hash of the public key; and
comparing the computed hash of the public key with a public key hash stored outside of the power management code to authenticate the power management code,
loading authenticated/trusted power management code into a memory of a secure environment of an operating system (OS); and
executing the power management code within the secure environment of the OS to handle power management tasks.

17. The machine-readable storage medium of claim 16, wherein the method further comprises verifying images of one or more modules within the power management code.

18. The machine-readable storage medium of claim 17, wherein verifying the images comprises:
decrypting a signature block of the power management code to form a first module hash block;
performing one or more hash operations on at least one portions of the power management code to generate a second module hash block; and
comparing the first and second module hash blocks to verify the one or more modules.

19. A data processing system, comprising:
a processor capable of executing one or more processes in one or more secure environment respectively;
a memory coupled to the processor; and
a process executed by the processor from the memory to cause the processor to
load authenticated/trusted power management code into a memory of a secure environment of an operating system (OS),
execute the power management code within the secure environment of the OS to handle power management tasks,
determine whether the secure environment of the OS is about to terminate, and
terminate and unload the power management code from the memory prior to terminating the secure environment of the OS.

20. A method, comprising:
launching a secure computing environment within an operating system of a data processing system in response to a request from a transaction;
dynamically loading a power management code for handling power management during launching the secure computing environment; and
dynamically unloading the power management code when the secure computing environment is terminated.

21. The method of claim 20, further comprising authenticating the power management code prior to loading the power management code.

22. The method of claim 21, wherein authenticating the power management code comprises verifying a first key stored within the power management code against with a second key stored outside of the power management code, and wherein the first key is stored in the power management code during manufacturing of the power management code.

23. The method of claim 22, wherein authenticating the power management code further comprises performing a checksum operation on at least a portion of the power management code.

24. The method of claim 20, wherein the secure environment and the power management code are loaded in a dedicated memory protected by at least one of software and hardware, and wherein the dedicated memory is not accessible by other non-secure components of the data processing system.

25. A machine-readable storage medium having executable code to cause a machine to perform a method for power management, the method comprising:
launching a secure computing environment within an operating system of a data processing system in response to a request from a transaction;
dynamically loading a power management code for handling power management during launching the secure computing environment; and
dynamically unloading the power management code when the secure computing environment is terminated.

26. The machine-readable storage medium of claim 25, wherein the method further comprises authenticating the power management code prior to loading the power management code.

27. The machine-readable storage medium of claim 26, wherein authenticating the power management code comprises verifying a first key stored within the power management code against with a second key stored outside of the power management code, and wherein the first key is stored in the power management code during manufacturing of the power management code.

* * * * *